(12) United States Patent
Park et al.

(10) Patent No.: US 10,400,857 B2
(45) Date of Patent: Sep. 3, 2019

(54) SILENT CHAIN

(71) Applicant: YUSHIN PRECISION INDUSTRIAL CO., LTD., Incheon (KR)

(72) Inventors: Youngkyun Park, Seongnam-si (KR); Jungjin Lee, Incheon (KR)

(73) Assignee: Yushin Precision Industrial Co., Ltd., Incheon (KR)

( * ) Notice: Subject to any disclaimer, the term of this patent is extended or adjusted under 35 U.S.C. 154(b) by 239 days.

(21) Appl. No.: 15/453,162

(22) Filed: Mar. 8, 2017

(65) Prior Publication Data

US 2018/0187748 A1 Jul. 5, 2018

(30) Foreign Application Priority Data

Dec. 29, 2016 (KR) .......................... 10-2016-0182857

(51) Int. Cl.
 F16G 13/04 (2006.01)
 F16G 13/08 (2006.01)
(52) U.S. Cl.
 CPC .............. *F16G 13/04* (2013.01); *F16G 13/08* (2013.01)
(58) Field of Classification Search
 CPC .......... F16G 13/02; F16G 13/04; F16G 13/08; F16G 13/18
 See application file for complete search history.

(56) References Cited

U.S. PATENT DOCUMENTS

| 5,423,724 A * | 6/1995 | Cole, Jr. ................... F16G 5/18 474/229 |
| 5,989,141 A | 11/1999 | Kozakura et al. |
| 6,186,920 B1 * | 2/2001 | Reber ..................... F16G 13/04 474/157 |
| 8,708,850 B2 | 4/2014 | Tohara |
| 8,968,132 B2 | 3/2015 | Miyanaga |
| 8,979,691 B2 | 3/2015 | Tokita et al. |
| 2008/0020882 A1 * | 1/2008 | Tohara ..................... F16G 13/02 474/212 |
| 2008/0032840 A1 * | 2/2008 | Hirschmann ........... F16G 13/04 474/212 |
| 2009/0042683 A1 | 2/2009 | Tohara |

(Continued)

FOREIGN PATENT DOCUMENTS

| JP | H09196126 A | 7/1997 |
| KR | 10-2009-0015800 A | 2/2009 |

(Continued)

*Primary Examiner* — Michael R Mansen
*Assistant Examiner* — Robert T Reese
(74) *Attorney, Agent, or Firm* — Harness, Dickey & Pierce, P.L.C.

(57) ABSTRACT

Provided is a silent chain. The silent chain includes a first guide plate having a first outer groove in a rear surface thereof, a second guide plate spaced apart from the first guide plate in a first direction, a first middle plate disposed between the first and second guide plates, at least one first inner plate disposed between the first middle plate and the first guide plate and having first inner grooves in a rear surface thereof, at least one second inner plate disposed between the first middle plate and the second guide plate, and a first connection pin configured to connect the first and second guide plates, the first and second inner plates, and the first middle plate to each other. The first inner groove and the first outer groove are located on an imaginary first line.

18 Claims, 13 Drawing Sheets

(56) References Cited

U.S. PATENT DOCUMENTS

| | | |
|---|---|---|
| 2011/0183800 A1 | 7/2011 | Tohara |
| 2011/0224041 A1 | 9/2011 | Tokita et al. |
| 2013/0196804 A1* | 8/2013 | Bodensteiner .......... F16G 13/02 474/148 |

FOREIGN PATENT DOCUMENTS

| | | |
|---|---|---|
| KR | 10-2011-0020911 A | 3/2011 |
| KR | 10-2011-0088395 A | 8/2011 |

* cited by examiner

SILENT CHAIN

CROSS-REFERENCE TO RELATED APPLICATIONS

This U.S. non-provisional patent application claims priority under 35 U.S.C. § 119 of Korean Patent Application No. 10-2016-0182857, filed on Dec. 29, 2016, the entire contents of which are hereby incorporated by reference.

BACKGROUND

The present disclosure relates to a silent chain, and more particularly, to a silent chain that suppresses contact abrasion with a chain guide.

A timing drive system includes a belt drive system and a chain drive system. The chain system having durability that is relatively superior to that of the existing belt system is being quickly expanded in application to extend the exchange period and lifespan of parts.

A bush chain, a roller chain, and a silent chain may be used as the chain that is applied to the chain drive system. The silent chain is a chain developed for reducing a noise that becomes a problem in the bush chain and the like. The silent chain may have superior effects in view of vibration and noise when compared to the push chain and the roller chain.

The silent chain may travel while coming into slide-contact with sliding surfaces of chain guides. Here, frictional force between the silent chain and the guide guides may occur. Also, the more the frictional force between the silent chain and the chain guides increases, the more power consumption may increase. Thus, for efficient power consumption in automobile industries, studies on reducing the frictional force between the silent chain and the chain guides are ongoing.

SUMMARY

The present disclosure provides a silent chain that is reduced in frictional force with a chain guide.

The objects of the present invention are not limited to the aforementioned object, but other objects not described herein will be clearly understood by those skilled in the art from descriptions below.

An embodiment of the inventive concept provides a silent chain includes: a first guide plate having a first outer groove in a rear surface thereof; a second guide plate spaced apart from the first guide plate in a first direction; a first middle plate disposed between the first and second guide plates; at least one first inner plate disposed between the first middle plate and the first guide plate and having first inner grooves in a rear surface thereof; at least one second inner plate disposed between the first middle plate and the second guide plate; and a first connection pin configured to connect the first and second guide plates, the first and second inner plates, and the first middle plate to each other, wherein the first inner groove and the first outer groove are located on an imaginary first line.

In an embodiment of the inventive concept, a silent chain includes: a first guide plate part; a second guide plate part spaced apart from the first guide plate part in the first direction; a middle plate part disposed between the first and second guide plate parts; a first inner plate part disposed between the first guide plate part and the middle plate part; a second inner plate part disposed between the second guide plate part and the middle plate part; a first oil passage part configured to cross a rear area of the first guide plate part and a rear area of the first inner plate part; a second oil passage part configured to cross a rear area of the second guide plate and a rear area of the second inner plate part; and a connection pin part configured to connect the first and second guide plate parts, the first and second inner plate parts, and the middle plate part to each other.

Particularities of other embodiments are included in the detailed description and drawings.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, ideas and embodiments of the inventive concept will be described in detail with reference to the accompanying drawings.

Figure 1:
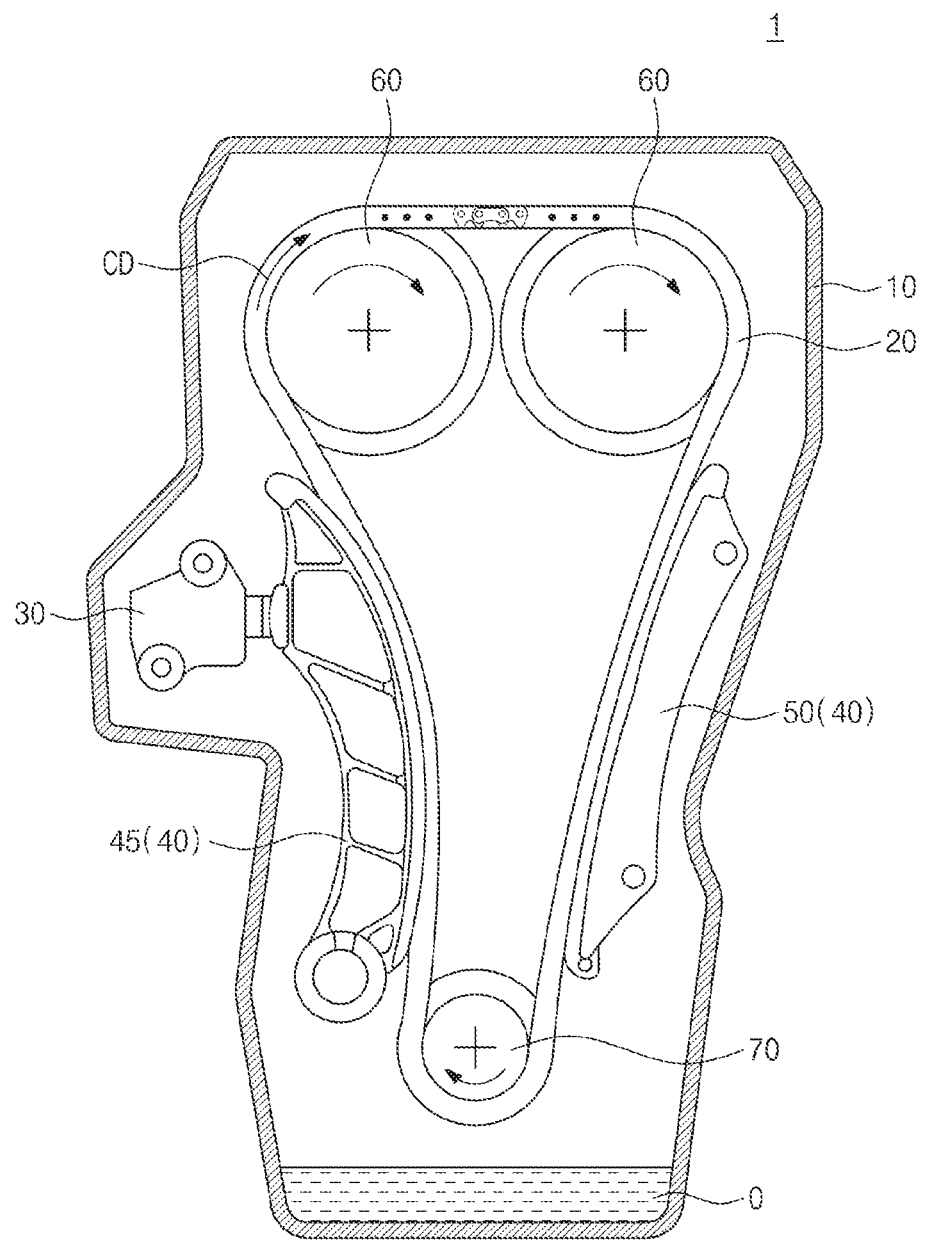
FIG. 1 is a schematic view of a timing chain system according to an embodiment of the inventive concept.

FIG. 1 is a schematic view of a timing chain system according to an embodiment of the inventive concept.

Referring to FIG. 1, a timing chain system 1 according to an embodiment of the inventive concept may be used for an engine of a vehicle. The timing chain system 1 may represent a system in which a crank sprocket of a crank shaft and a cam sprocket of a cam shaft are connected to each other through a chain to rotate the cam shaft.

The timing chain system 1 may include a housing 10, a silent chain 20, a tensioner 30, a chain guide member 40, a driving sprocket 70, and driven sprockets 60.

The housing 10 may have a space therein. The silent chain 20, the tensioner 30, the chain guide member 40, the driving sprocket 70, and the driven sprockets 60 may be disposed in the inner space of the housing 10. Oil O may be stored on a bottom region of the inner space of the housing 10. The oil O may be provided to the silent chain 20 and the tensioner 30 through an oil pump (not shown).

The silent chain 20 may connect the driving sprocket 70 to the driven sprockets 60. The silent chain 20 may be rotated by the driving sprocket 70. The silent chain 20 may have a traveling direction CD that is equal to a rotation direction of the driving sprocket 70. The silent chain 20 may surround the driving sprocket 70 and the driven sprockets 60. That is, the silent chain 20 may have a close loop shape. The silent chain 20 will be described below in detail.

The driving sprocket 70 may be connected to the crank shaft. The driving sprocket 70 may be rotated by receiving driving force of the crank shaft. The driving sprocket 70 may be disposed below the driven sprockets 60.

The driven sprockets 60 may be connected to the driving sprocket 70 through the silent chain 20. When the driving sprocket 70 is rotated, the driven sprockets 60 may be rotated by the silent chain 20. The driven sprockets 60 may be connected to cam shafts (not shown) to rotate the cam shafts.

The driving sprocket 70 and the driven sprockets 70 may be rotated in a clockwise direction. Thus, the traveling direction CD of the silent chain 20 may be the clockwise direction.

The chain guide member 40 may guide the traveling of the silent chain 20. The chain guide member 40 may come into slide-contact with the silent chain 20. Thus, frictional force may occur between the silent chain 20 and the chain guide member 40. The chain guide member 40 may be disposed between the driving sprocket 70 and the driven sprockets 60. The chain guide member 40 may include a first chain guide 45 and a second chain guide 50.

The first chain guide 45 may be connected to the tensioner 30. The first chain guide 45 may move by the tensioner 30. For example, the first chain guide 45 may have an end area fixed to a hinge shaft (not shown). The first chain guide 45 may be rotated with respect to the hinge shaft by the tensioner 30.

The second chain guide 50 may be disposed to face the first chain guide 45. The second chain guide 50 may be fixed inside the housing 10.

The tensioner 30 may be connected to the first chain guide 45. The tensioner 30 may push or pull the first chain guide 45. Thus, the tensioner 30 may adjust tension of the silent chain 20 through the first chain guide 45.

Figure 2:
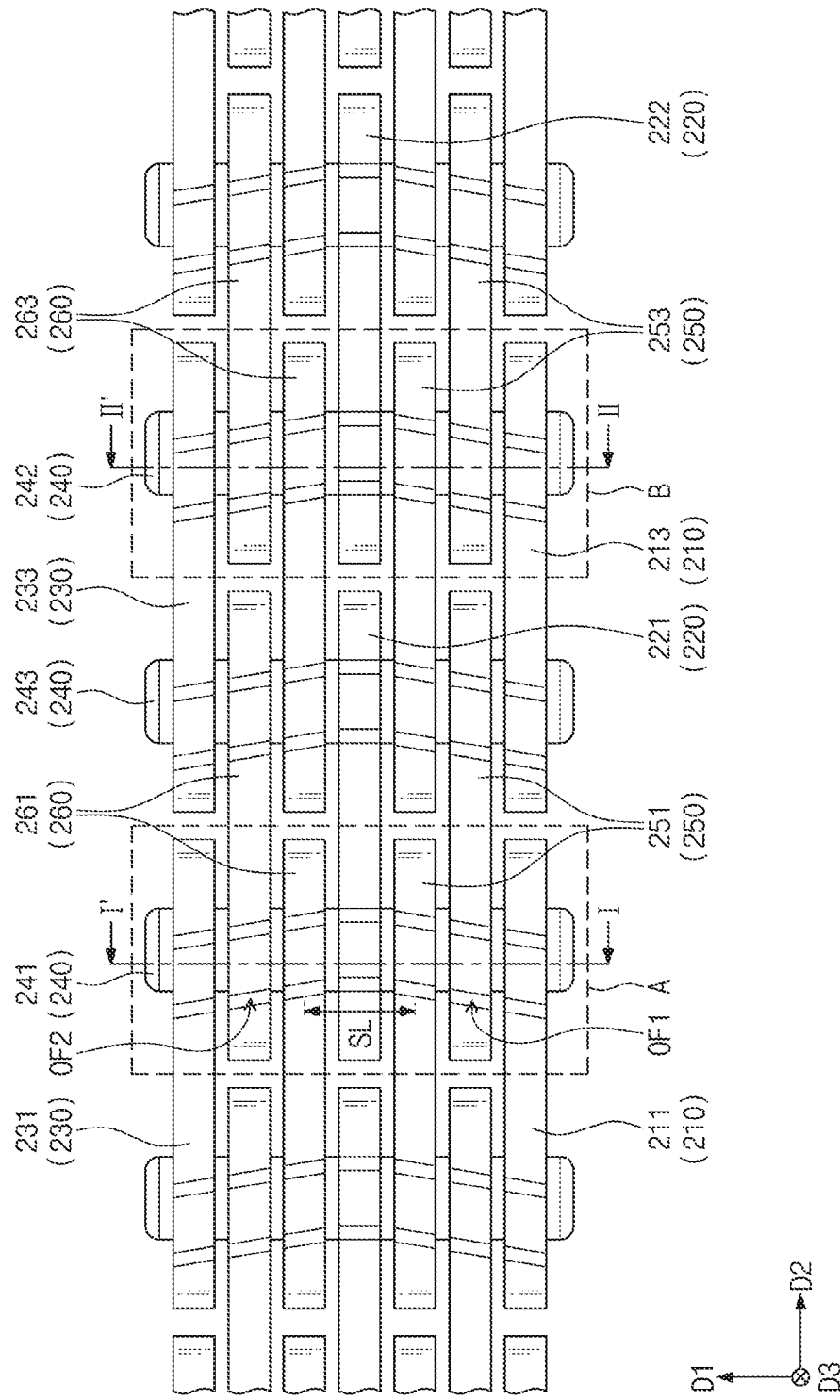
FIG. 2 is a plan view illustrating a portion of a silent chain of FIG. 1.
Figure 3:
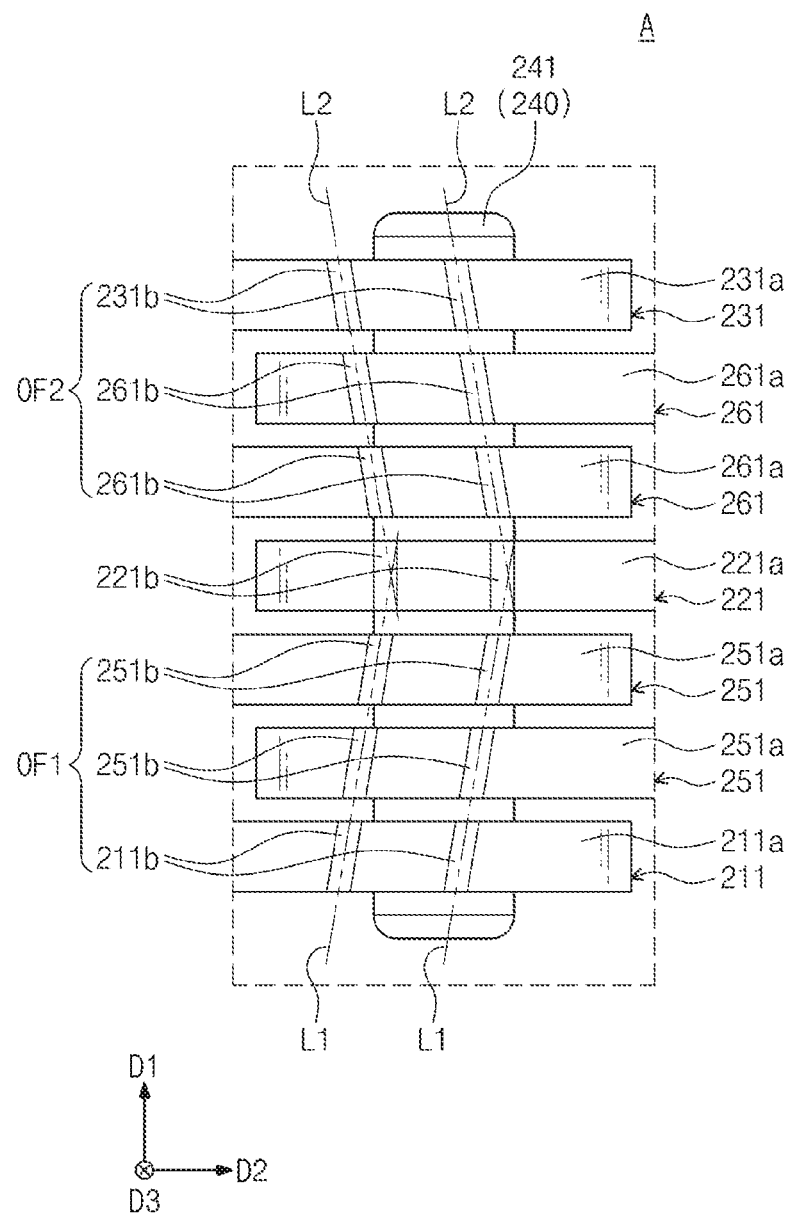
FIG. 3 is an enlarged view of a region A of FIG. 2.
Figure 4:
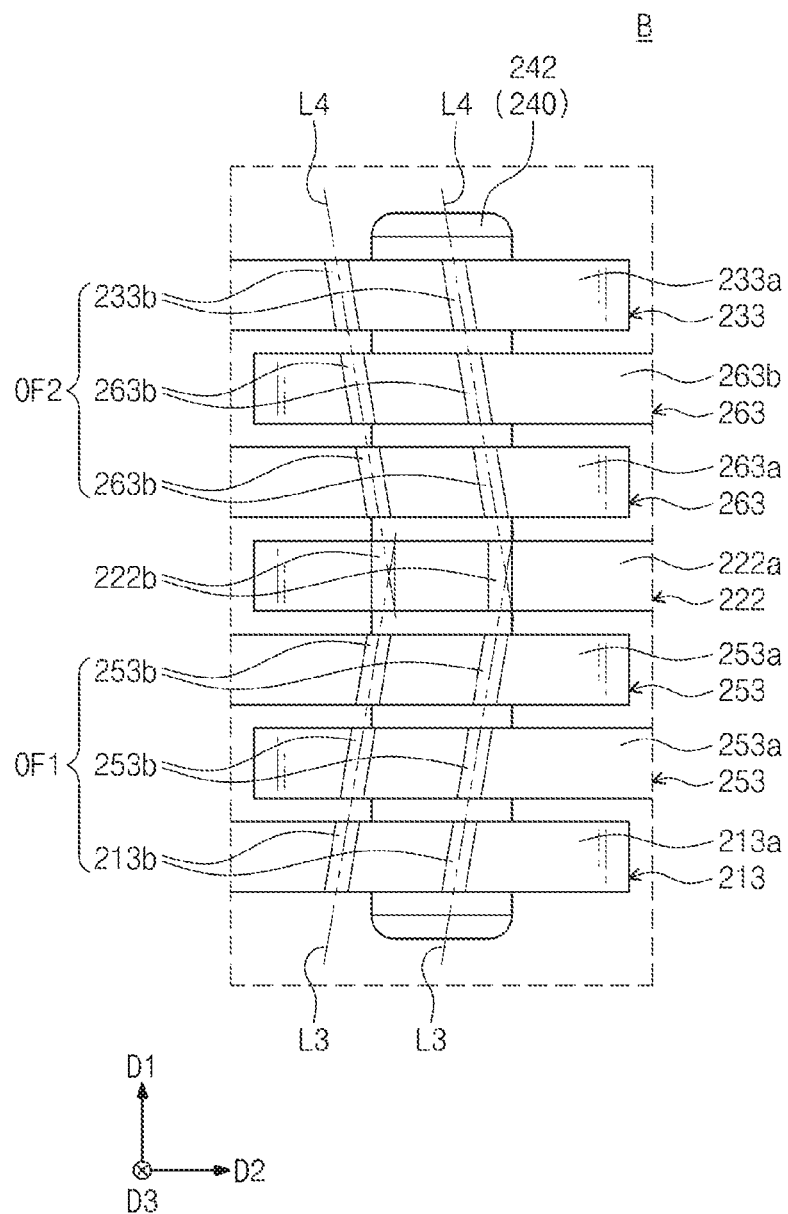
FIG. 4 is an enlarged view of a region B of FIG. 2.

FIG. 2 is a plan view illustrating a portion of the silent chain of FIG. 1. FIG. 3 is an enlarged view of a region A of FIG. 2. FIG. 4 is an enlarged view of a region B of FIG. 2.

Referring to FIGS. 2, 3, and 4, the silent chain 20 may include guide parts 210 and 230, link parts 220, 250, and 260, and a connection pin part 240.

The guide parts 210 and 230 may be disposed on the outermost sides of the link parts 220, 250, and 260. The guide parts 210 and 230 may include a first guide plate part 210 disposed on one side of the link parts 220, 250, and 260 and a second guide plate part 230 disposed on the other side of the link parts 220, 250, and 260. The second guide plate part 230 may be spaced apart from the first guide plate part 210 in a first direction D1. That is, the first and second guide plate parts 210 and 230 may be disposed on both sides of the chain, respectively. Thus, a space may be defined between the first and second guide plate parts 210 and 230. The link parts 220, 250, and 260 may be disposed in the space. The first and second guide plate parts 210 and 230 may be disposed to face each other.

The first guide plate part 210 may include a plurality of first guide plates 211 arranged at a predetermined distance in a second direction D2 perpendicular to the first direction D1 or in a longitudinal direction of the chain and third guide plates 213 disposed between the first guide plates 211 adjacent to each other. The first and third guide plates 211 and 213 may be alternately arranged in the second direction D2 or in the longitudinal direction of the chain. The third guide plates 213 may be spaced apart from the first guide plates 211 in the second direction D2. Here, a width direction of the chain may be parallel to the first direction D1. The longitudinal direction of the chain may be parallel to the second direction D2 perpendicular to the first direction D1.

Each of the first guide plates 211 may have at least one first outer groove 211*b* in a rear surface 211*a* thereof. Each of the third guide plates 213 may have at least one third outer groove 213*b* in a rear surface 213*a* thereof. In an embodiment, each of the first and third outer grooves 211*b* and 213*b* may be provided in plurality. The first outer grooves 211*b* and the third outer grooves 213*b* may be arranged in the second direction D2. For example, the first outer grooves 211*b* and the third outer grooves 213*b* may be arranged at a predetermined distance in the second direction D2. Each of the first outer grooves 211*b* and the third outer grooves 213*b* may extend to the second guide plate part 230. Each of the first outer grooves 211*b* and the third outer grooves 213*b* may extend in a direction that is not perpendicular to the second direction D2, i.e., at a first angle. That is, each of the first outer grooves 211*b* and the third outer grooves 213*b* may extend to be inclined with respect to the second direction D2. The first angle may be an acute angle, but is not limited thereto. The oil may be accommodated in the first outer grooves 211*b* and the third outer grooves 213*b*.

The second guide plate part 230 may include a plurality of second guide plates 231 arranged at a predetermined distance in the second direction D2 or in the longitudinal direction of the chain and a fourth guide plates 233 disposed between the second guide plates 233 adjacent to each other. The second and fourth guide plates 231 and 233 may be alternately arranged in the second direction D2 or in the longitudinal direction of the chain. Each of the fourth guide plates 233 may be spaced apart from each of the second guide plates 231 in the second direction D2.

The second guide plates 231 may be spaced apart from the first guide plates 211 in the first direction D1. The first and second guide plates 211 and 231 may overlap each other in the first direction D1 or in the width direction of the chain. Each of the second guide plate 231 may have at least one second outer groove 231*b* in a rear surface 231*a* thereof.

The fourth guide plate 233 may be spaced apart from the third guide plate 213 in the first direction D1. The third and fourth guide plates 213 and 233 may overlap each other in the first direction or in the width direction of the chain. The fourth guide plate 233 may be spaced apart from the second guide plate 231 in the second direction D2. Each of the fourth guide plates 233 may have at least one fourth outer groove 233*b* in a rear surface 233*a* thereof.

In an embodiment, each of the second and fourth outer grooves 231*b* and 233*b* may be provided in plurality. The second outer grooves 231*b* and the fourth outer grooves 233*b* may be arranged in the second direction D2 or in the longitudinal direction of the chain. For example, the second outer grooves 231*b* and the fourth outer grooves 233*b* may be arranged at a predetermined distance in the second direction D2. Each of the second outer grooves 231*b* and the fourth outer grooves 233*b* may extend to the first guide plate part 210. Each of the second outer grooves 231*b* and the fourth outer grooves 233*b* may extend in a direction that is not perpendicular to the second direction D2, i.e., at a second angle. That is, each of the second outer grooves 231*b* and the fourth outer grooves 233*b* may extend to be inclined with respect to the second direction D2. The second angle may be equal to the first angle. The second angle may be an acute angle, but is not limited thereto. The oil may be accommodated in the second outer grooves 231b and the fourth outer grooves 233b.

The link parts 220, 250, and 260 may be disposed between the first and second guide plate parts 210 and 230. The link parts 220, 250, and 260 may include a plurality of link plates arranged to cross each other in the width direction of the chain and the longitudinal direction of the chain. For example, the link plates may be arranged in the width direction of the chain. The link plates arranged in the width direction of the chain may partially overall each other. That is, the link plates arranged in the width direction of the chain may be disposed to be dislocated by a half pitch thereof with respect to each other. The link plates may be arranged in the longitudinal direction of the chain. Here, the pitch may represent a length of each of the link plates in the second direction D2 and a length of each of the guide plates in the second direction D2. The link plates may partially overlap the guide plates in the first direction D1 or in the width direction of the chain.

The link parts 220, 250, and 260 may include a middle plate part 220, a first inner plate part 250, and a second inner plate part 260.

The middle plate part 220 may be disposed on a middle area of the chain. The middle plate part 220 may be disposed between the first inner plate part 250 and the second inner plate part 260. The middle plate part 220 may include the plurality of link plates arranged in the second direction D2 or in the longitudinal direction of the chain. For convenience of description, the link plate of the middle plate part 220 will be called a middle plate.

The middle plate part may include a plurality of first middle plates 221 arranged at a predetermined distance in the second direction D2 or in the longitudinal direction of the chain and a plurality of second middle plates 222 disposed between the first middle plates 221 adjacent to each other.

The middle plate 221 may be disposed between the first and second guide plates 211 and 231. The first middle plates 221 may partially overlap the first and second guide plates 211 and 231 in the width direction of the chain. For example, each of the first middle plate 221 may be disposed to be dislocated by a half pitch from the first and second guide plates 211 and 231.

The second middle plates 222 may be spaced apart from the first middle plates in the second direction D2. The second middle plate 222 may be disposed between the third and fourth guide plates 213 and 233. The second middle plates may partially overlap the third and fourth guide plates 213 and 233 in the width direction of the chain. For example, the second middle plate 222 may be disposed to be dislocated by a half pitch from the third and fourth guide plates 213 and 233.

In an embodiment, the first middle plate 221 may have at least one first middle groove 221b in a rear surface 221a thereof. The second middle plate 222 may have at least one second middle groove 222b in a rear surface 222a thereof. Each of the first and second middle grooves 221b and 222b may be provided in plurality. The first and second middle groves 221b and 222b may be arranged in the second direction D2 or in the longitudinal direction of the chain. Each of the first and second middle grooves 221b and 222b may be parallel to the first direction D1 or in the width direction of the chain. On the other hand, in another embodiment, each of the middle grooves 221b and 222b may be omitted or have an approximately V shape, but is not limited thereto.

The first inner plate part 250 may be disposed between the middle plate part 220 and the first guide plate part 210. The first inner plate part 250 may include a plurality of first inner plates 251 arranged at a predetermined distance in the second direction D2 or in the longitudinal direction of the chain and a third inner plates 253 disposed between the first inner plates 251 adjacent to each other. Here, the first and third inner plates 251 and 253 may be the above-described link plates. The first inner plates 251 may be arranged in the longitudinal direction of the chain and also arranged in the first direction D1 or in the width of the chain. The first inner plates 251 arranged in the width direction of the chain may be arranged to be dislocated by a half pitch thereof with respect to each other.

The first inner plates 251 may be disposed between the first guide plates 211 and the first middle plates 221. Each of the first inner plates 251 may have at least one first inner groove 251b in a rear surface 251a thereof.

The third inner plates 253 may be arranged in the longitudinal direction of the chain and also arranged in the first direction D1 or in the width of the chain. The third inner plates 253 arranged in the width direction of the chain may be arranged to be dislocated by a half pitch thereof with respect to each other.

The third inner plates 253 may be disposed between the first middle plates 221 and the second guide plates 231. The third inner plates 253 may be spaced apart from the first inner plates 251 in the second direction D2. Each of the third inner plates 253 may have at least one third inner groove 253b in a rear surface 253a thereof.

In an embodiment, each of the first and third inner grooves 251b and 253b may be provided in plurality. The first inner grooves 251b and the third inner grooves 253b may be arranged at a predetermined distance in the second direction D2 or in the longitudinal direction of the chain. Each of the first inner grooves 251b and the third inner grooves 253b may extend to the middle plate part 220. Each of the first inner grooves 251b and the third inner grooves 253b may extend in a direction that is not perpendicular to the second direction D2, i.e., at a third angle. That is, each of the first inner grooves 251b and the third inner grooves 253b may extend to be inclined with respect to the second direction D2 or the longitudinal direction of the chain. The third angle may be an acute angle, but is not limited thereto. The third angle may be equal to the first angle. The oil may be accommodated in the first inner grooves 251b and the third inner grooves 253b.

At least one of the first inner grooves 251b and at least one of the first outer grooves 211b may be defined in a part of an imaginary first line L1. At least one of the first inner grooves 251b and at least one of the first outer grooves 211b may be located on the imaginary first line L1. The first outer groove 211b and the second inner groove 251b, which are located on the first line L1, may define a first passage (not shown). The first passage may be located on the first line L1. The first line L1 may have a first angle with respect to the second direction D2. The first middle groove 221b may have one end located on the first line L1.

At least one of the third inner grooves 253b and at least one of the third outer grooves 213b may be defined in a part of an imaginary third line L3. At least one of the third inner grooves 253b and at least one of the third outer grooves 213b may be located on the imaginary third line L3. The third outer grooves 213b and the third inner grooves 253b, which are located on the third line L3, may define a third passage (not shown). The third passage may be located on the third line L3. The third line L3 may have a third angle with respect to the second direction D2. The second middle groove 222*b* may have one end located on the third line L3. The third line L3 may be parallel to the first line L1. The first passage and the third passage may be formed in one side of the middle plate part 220. The first passage and the third passage may be parallel to each other. The first passage and the third passage may constitute a first oil passage part OF1.

The first oil passage part OF1 may cross an area of the rear surface of the first guide plate part 210, i.e., an area of the rear surface of the first inner plate part 250. The first oil passage part OF1 may include grooves 211*b* and 231*b* formed in the area of the rear surface of the first guide plate part 210 and grooves 251*b* and 253*b* formed in the area of the rear surface of the first inner plate part 250. Here, the area of the rear surface of the first guide plate part 210 may represent the rear surfaces 211*a* and 213*a* of the first and third guide plates 211 and 213, and the area of the rear surface of the first inner plate part 250 may represent the rear surfaces 251*a* and 253*a* of the first and third inner plate parts 251 and 253.

The second inner plate part 260 may be disposed between the middle plate part 220 and the second guide plate part 230. The second inner plate part 260 may include a plurality of first inner plates 261 arranged at a predetermined distance in the second direction D2 or in the longitudinal direction of the chain and a fourth inner plates 261 disposed between the second inner plates 261 adjacent to each other. Here, the first and third inner plates 251 and 253 may be the above-described link plates. The second inner plates 261 may be arranged in the longitudinal direction of the chain and also arranged in the first direction D1 or in the width of the chain. The second inner plates 261 arranged in the width direction of the chain may be arranged to be dislocated by a half pitch thereof with respect to each other.

The second guide plates 261 may be spaced apart from the first inner plates 251 in the first direction D1. The second inner plates 261 may be disposed between the first middle plates 221 and the second guide plates 231. Each of the second inner plates 261 may have at least one second inner groove 261*b* in a rear surface 261*a* thereof.

The fourth inner plates 263 may be arranged in the longitudinal direction of the chain and also arranged in the first direction D1 or in the width of the chain. The fourth inner plates 263 arranged in the width direction of the chain may be arranged to be dislocated by a half pitch thereof with respect to each other.

The fourth inner plates 263 may be disposed between the second middle plates 222 and the fourth guide plates 233. The fourth inner plates 263 may be spaced apart from the second inner plates 251 in the second direction D2. Each of the fourth inner plates 263 may have at least one fourth inner groove 263*b* in a rear surface 263*a* thereof.

In an embodiment, each of the second and fourth inner grooves 261*b* and 263*b* may be provided in plurality. The second inner grooves 261*b* and the fourth inner grooves 263*b* may be arranged at a predetermined distance in the second direction D2 or in the longitudinal direction of the chain. Each of the second inner grooves 261*b* and the fourth inner grooves 263*b* may extend to the middle plate part 220. Each of the second inner grooves 261*b* and the fourth inner grooves 263*b* may extend in a direction that is not perpendicular to the second direction D2, i.e., at a fourth angle. That is, the second inner grooves 261*b* and the fourth inner grooves 263*b* may be extend to be inclined with respect to the second direction D2 or the longitudinal direction of the chain. The fourth angle may be an acute angle, but is not limited thereto. The fourth angle may be equal to the third angle. The oil may be accommodated in the second inner grooves 261*b* and the fourth inner grooves 263*b*.

At least one of the second inner grooves 261*b* and at least one of the second outer grooves 231*b* may be defined in a part of an imaginary second line L2. At least one of the second inner grooves 261*b* and at least one of the second outer grooves 231*b* may be located on the imaginary second line L2. The second outer grooves 231*b* and the second inner grooves 261*b*, which are located on the second line L2, may define a second passage (not shown). The second passage may be located on the second line L2. The second line L2 may have a second angle with respect to the second direction D2 or the longitudinal direction of the chain. The first middle groove 222*b* may have the other end located on the second line L2. The first line L1 and the second line L2 may be different from each other. The first and second lines L1 and L2 may intersect with each other. The first and second lines L1 and L2 intersecting with each other may have an angle of intersection less than that of about 180°. Each of the first and second lines L1 and L2 may be a straight line or a curved line.

At least one of the fourth inner grooves 263*b* and at least one of the fourth outer grooves 233*b* may be defined in a part of an imaginary fourth line L4. At least one of the fourth inner grooves 263*b* and at least one of the fourth outer grooves 233*b* may be located on the imaginary fourth line L4. Thus, the fourth outer grooves 233*b* and the fourth inner grooves 263*b* may define a fourth passage (not shown). The fourth passage may be located on the fourth line L4. The fourth line L4 may have a fourth angle with respect to the second direction D2 or the longitudinal direction of the chain. The second middle groove 222*b* may have the other end located on the fourth line L4. The first and second lines L1 and L2 may intersect with each other. The third and fourth lines L3 and L4 intersecting with each other may have an angle of intersection less than that of about 180°. Each of the third and fourth lines L3 and L4 may be a straight line or a curved line. The fourth line L4 may be parallel to the second line L2. The second passage and the fourth passage may be defined in the other side of the middle plate part 220. The second passage and the fourth passage may be parallel to each other. The second passage and the fourth passage may constitute a second oil passage part OF2.

The second oil passage part OF2 may cross an area of the rear surface of the second guide plate part 230, i.e., an area of the rear surface of the second inner plate part 260. The second oil passage part OF2 may include grooves 231*b* and 233*b* formed in the area of the rear surface of the second guide plate part 230 and grooves 261*b* and 263*b* formed in the area of the rear surface of the second inner plate part 260. Here, the area of the rear surface of the second guide plate part 230 may represent the rear surfaces 231*a* and 233*a* of the second and fourth guide plates 231 and 233, and the area of the rear surface of the second inner plate part 260 may represent the rear surfaces 261*a* and 263*a* of the second and fourth inner plate parts 261 and 263.

The first and second oil passage parts OF1 and OF2 may be defined to face each other. In an embodiment, the first oil passage part OF1 and the second oil passage part OF2 may be symmetrical to each other with respect to the middle plate part 220.

Each of the first and second oil passage parts OF1 and OF2 may be inclined with respect to the second direction D2. For example, in view of the plane, each of the first and second oil passage parts OF1 and OF2 may have an approximately V shape. Also, a spaced distance SL between the first and second oil passage parts OF1 and OF2 may increase in a direction that is away from the middle plate part 220. Here, the spaced distance SL between the first and second oil passage parts OF1 and OF2 may be parallel to the first direction D1.

The connection pin part 240 may connect the guide parts 210 and 230 to the link parts 220, 250, and 260. That is, the connection pin part 240 may successively connect the first guide plate part 210, the first inner plate part 250, the middle plate part 220, the second inner plate part 260, and the second guide plate part 230 to each other. The connection pin part 240 may include a plurality of connection pins. Each of the connection pins may have a cylindrical shape, but is not limited thereto. The connection pins may pass through the guide plates and the link plates. Each of the guide plate and the link plate may be connected to each other through two connection pins.

In an embodiment, the connection pin part 240 may include first to third connection pins 241, 242, and 243. The silent chain 20 may include more connection pines. However, for briefness of description, the first to third connection pines 241, 242, and 243 will be described as an example.

The first connection pin 241 may successively pass through the first guide plate 211, the first inner plates 251, the first middle plate 221, the second inner plates 261, and the second guide plate 231 to connect them to each other. The second connection pin 242 may be spaced apart from the first connection pin 241 in the second direction D2. The second connection pin 242 may successively pass through the third guide plate 213, the third inner plates 253, the second middle plate 222, the fourth plates 263, and the fourth guide plate 233 to connect them to each other.

The third connection pin 243 may be disposed between the first and second connection pins 241 and 242. The third connection pin 243 may successively pass through the third guide plate 213, the first inner plates 251, the first middle plate 221, the second inner plates 261, and the fourth guide plate 233 to connect them to each other.

A spaced distance between the first and third connection pins 241 and 243 may be the same as that between the second and third connection pins 242 and 243. However, the embodiment of the inventive concept is not limited thereto.

Figure 5:
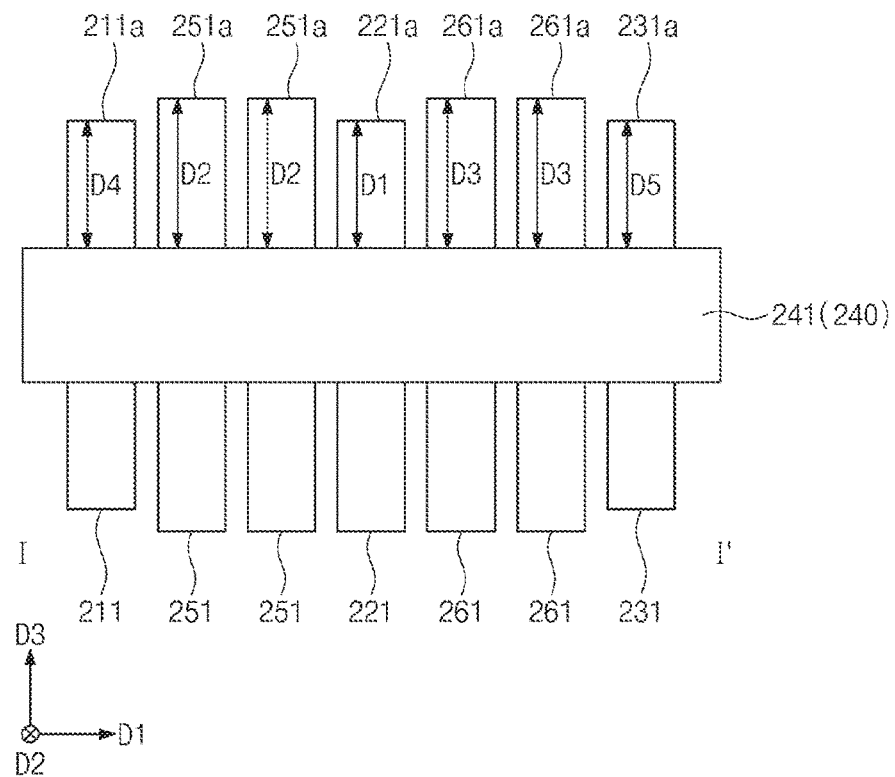
FIG. 5 is a cross-sectional view taken along line I-I' of FIG. 2.
Figure 6:
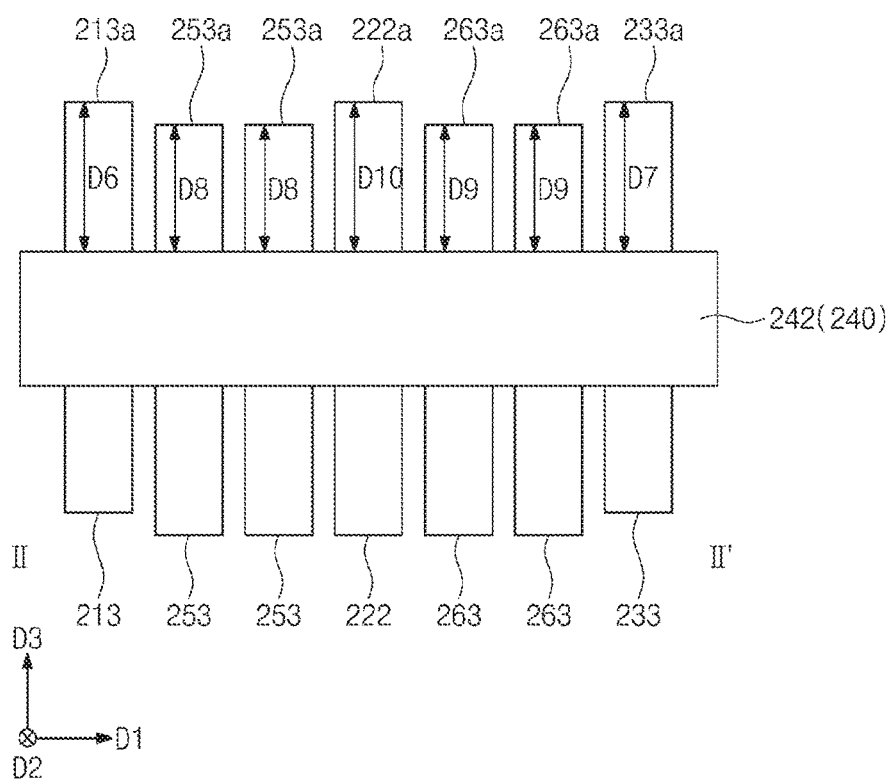
FIG. 6 is a cross-sectional view taken along line II-IF of FIG. 2.

FIG. 5 is a cross-sectional view taken along line I-I' of FIG. 2. FIG. 6 is a cross-sectional view taken along line II-II of FIG. 2.

Referring to FIGS. 2, 3, and 5, a first spaced distance D1 between the first connection pin 241 and the rear surface 221a of the first middle plate 221 may be less than a second spaced distance D2 between the first connection pin 241 and the rear surface 251a of the first inner plate 251. Also, the first spaced distance D1 may be less than a third spaced distance D2 between the first connection pin 241 and the rear surface 261a of the second inner plate 261. The second and third spaced distances D2 and D3 may be approximately the same. The rear surfaces 251a and 261a of the first and second inner plates 251 and 261 may be disposed on the same first plane (not shown).

A fourth spaced distance D4 between the first connection pin 241 and the rear surface 211a of the first guide plate 211 may be less than the second spaced distance D2. A fifth spaced distance D5 between the first connection pin 241 and the rear surface 231a of the second guide plate 231 may be less than the third spaced distance D3. The first, fourth, and fifth spaced distances D1, D4, and D5 may be approximately the same. The rear surface 221a of the first middle plate 221 and the rear surfaces 211a and 231a of the first and second guide plates 211 and 231 may be disposed on the same second plane (not shown). The first and second planes may be parallel to the first and second directions D1 and D2.

The rear surfaces 251a and 261a of the first and second inner plates 251 and 261 may be spaced apart from the rear surface 221a of the first middle plate 221 and the rear surfaces 211a and 231a of the first and second guide plates 211 and 231 in a third direction D3 that is perpendicular to the first and second directions D1 and D2. The first plane may be located in the third direction D3 from the second plane.

Referring to FIGS. 2, 4, 5, and 6, a sixth spaced distance D6 between the second connection pin 242 and the rear surface 213a of the third guide plate 213 may be greater than the fourth spaced distance D4. The rear surfaces 213a of the third guide plates 213 may be spaced apart from the rear surfaces 211a of the first guide plates 211 in the third direction D3.

A seventh spaced distance D7 between the second connection pin 242 and the rear surface 233a of the fourth guide plate 233 may be greater than the fifth spaced distance D5. The rear surfaces 233a of the fourth guide plates 233 may be spaced apart from the rear surfaces 231a of the second guide plates 231 in the third direction D3.

An eighth spaced distance D8 between the second connection pin 242 and the third inner plate 253 may be less than the second spaced distance D2. The rear surfaces 251a of the first inner plates 251 may be spaced apart from the rear surfaces 253a of the third inner plates 253 in the third direction D3. The eighth spaced distance D8 may be less than the sixth spaced distance D6.

A ninth spaced distance D9 between the second connection pin 242 and the rear surface 263a of the fourth inner plate 263 may be less than the third spaced distance D3. The rear surfaces 261a of the second inner plates 261 may be spaced apart from the rear surfaces 263a of the fourth inner plates 263 in the third direction D3. The eighth and ninth spaced distances D8 and D9 may be approximately the same. The rear surfaces 253a and 263a of the third and fourth inner plates 253 and 263 may be disposed on the same third plane (not shown). The ninth spaced distance D9 may be less than the seventh spaced distance D7.

A tenth spaced distance D10 between the second connection pin 242 and the rear surface of the second middle plate 222 may be greater than the first spaced distance D1. The rear surfaces 222a of the second middle plates 222 may be spaced apart from the rear surfaces 221a of the first middle plate 221 in the third direction D3. The tenth spaced distance D10 may be greater than the eighth and ninth spaced distances D8 and D9. The rear surface 222a of the second middle plate 222 may be spaced apart from the rear surface 221a of the first middle plate 221 and the rear surfaces 253a and 263a of the third and fourth inner plates 253 and 263 in the third direction D3. The sixth, seventh, and tenth spaced distances D6, D7, and D10 may be approximately the same. The rear surface 222a of the second middle plate 222 and the rear surfaces 213a and 233a of the third and fourth guide plates 213 and 233 may be disposed on the same fourth plane (not shown). The third and fourth planes may be parallel to the first and second directions D1 and D2.

Figure 7:
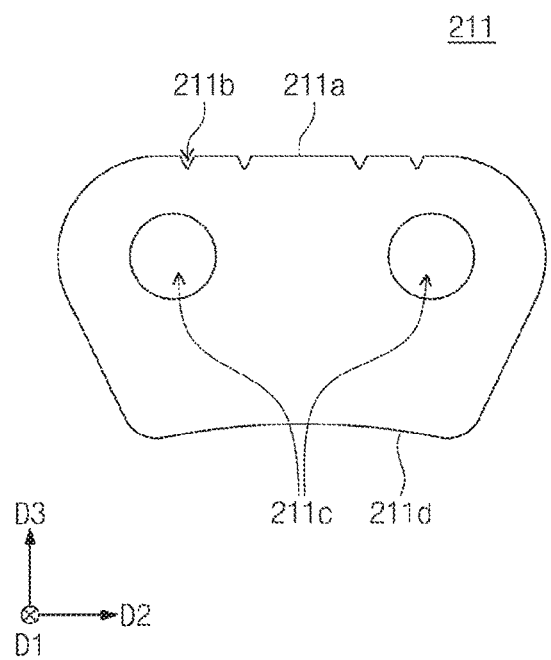
FIG. 7 is a schematic view of a guide plate of FIG. 2.

FIG. 7 is a schematic view of the guide plate of FIG. 2. The guide plate of FIG. 7 may be the first guide plate. The first guide plate may be equal or similar to each of the second to fourth guide plates.

Referring to 2 and 7, the guide plate 211 may have the plurality of grooves 211b in the rear surface 211a thereof. As described above, the plurality of grooves 211b of the guide plate 211 may be arranged in the second direction D2 or in the longitudinal direction of the chain. In an embodiment, the grooves 211b of the guide plate 211 may be spaced a predetermined distance from each other. On the other hand, in another embodiment, at least two of the distances between the grooves 211b of the guide plate 211 may be different from each other. For example, the distances between the grooves 211b of the guide plate 211 may gradually decrease in the second direction D2. Each of the plurality of grooves 211b may have a longitudinal cross-section with an approximate V shape, but is not limited thereto.

The rear surface 211a of the guide plate 211 may be substantially flat. The guide plate 211 may have a recessed surface 211d. The recessed surface 211d may be disposed to face the rear surface 211b. The recessed surface 211d may be a curved surface that is recessed in the third direction D3. The guide plate 211 may have a pair of pin holes 211c passing therethrough between the rear surface 211b and the recessed surface 211d. The pair of pin holes 211c may be spaced apart from each other in the second direction D2 or in the longitudinal direction of the chain.

The oil may be accommodated in the grooves 211b of the guide plate 211. The rear surface 211a of the guide plate 211 may come into contact with a chain guide member (see reference numeral 40 of FIG. 14). The oil within the grooves 211b may be supplied to a sliding surface (see reference numeral 41 of FIG. 14) of the chain guide member 40. Thus, frictional force between the rear surface 211a of the guide plate 211 and the sliding surface 41 may be reduced.

Since the grooves 211b are defined in the rear surface 211a of the guide plate 211, the rear surface 211a of the guide plate 211, which comes into contact with the sliding surface 41, may be reduced in area. Thus, the frictional force between the sliding surface 41 and the rear surface 211a of the guide plate 211 may be reduced.

Figure 8:
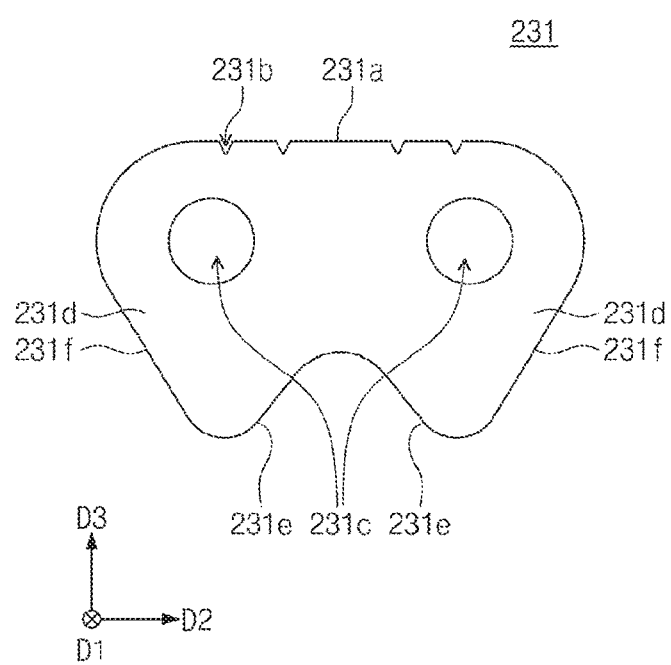
FIG. 8 is a schematic view of a link plate of FIG. 2.

FIG. 8 is a schematic view of the link plate of FIG. 2. The link plate of FIG. 8 may be the first inner plate. The first inner plate may be equal or similar to each of the second to fourth inner plates and the first and second middle plates.

Referring to FIGS. 2 and 8, the link plate 231 may have the plurality of grooves 231b in the rear surface 231a thereof. As described above, the plurality of grooves 231b of the link plate 231 may be arranged in the second direction D2 or in the longitudinal direction of the chain. In an embodiment, the grooves 231b of the link plate 231 may be spaced a predetermined distance from each other. On the other hand, in another embodiment, at least two of the distances between the grooves 231b of the link plate 231 may be different from each other. For example, the distances between the grooves 231b of the link plate 231 may gradually decrease in the second direction D2. Each of the plurality of grooves 231b may have a longitudinal cross-section with an approximate V shape, but is not limited thereto.

The rear surface 231a of the link plate 231 may be substantially flat. The link plate 231 may have sawtooth parts 231d. The sawtooth parts 231d may be disposed to face the rear surface 231a of the link plate 231. Each of the sawtooth parts 231d may have an inner flank surface 231e and an outer flank surface 231f. The inner flank surfaces 231e may be engaged with sawteeth of the driving sprocket 70 and/or sawteeth of the driven sprockets 60. The inner flank surfaces 231e of the sawtooth parts 231d may be disposed to face each other.

The link plate 231 may have a pair of pin holes 231c passing therethrough between the rear surface 231a and the sawtooth parts 231d. The pair of pin holes 231c may be spaced apart from each other in the longitudinal direction of the chain. As illustrated in FIGS. 3 and 4, the pin holes of the link plates and the guide plates, which are arranged in the width direction of the chain, may overlap each other in the width direction of the chain.

Figure 9:
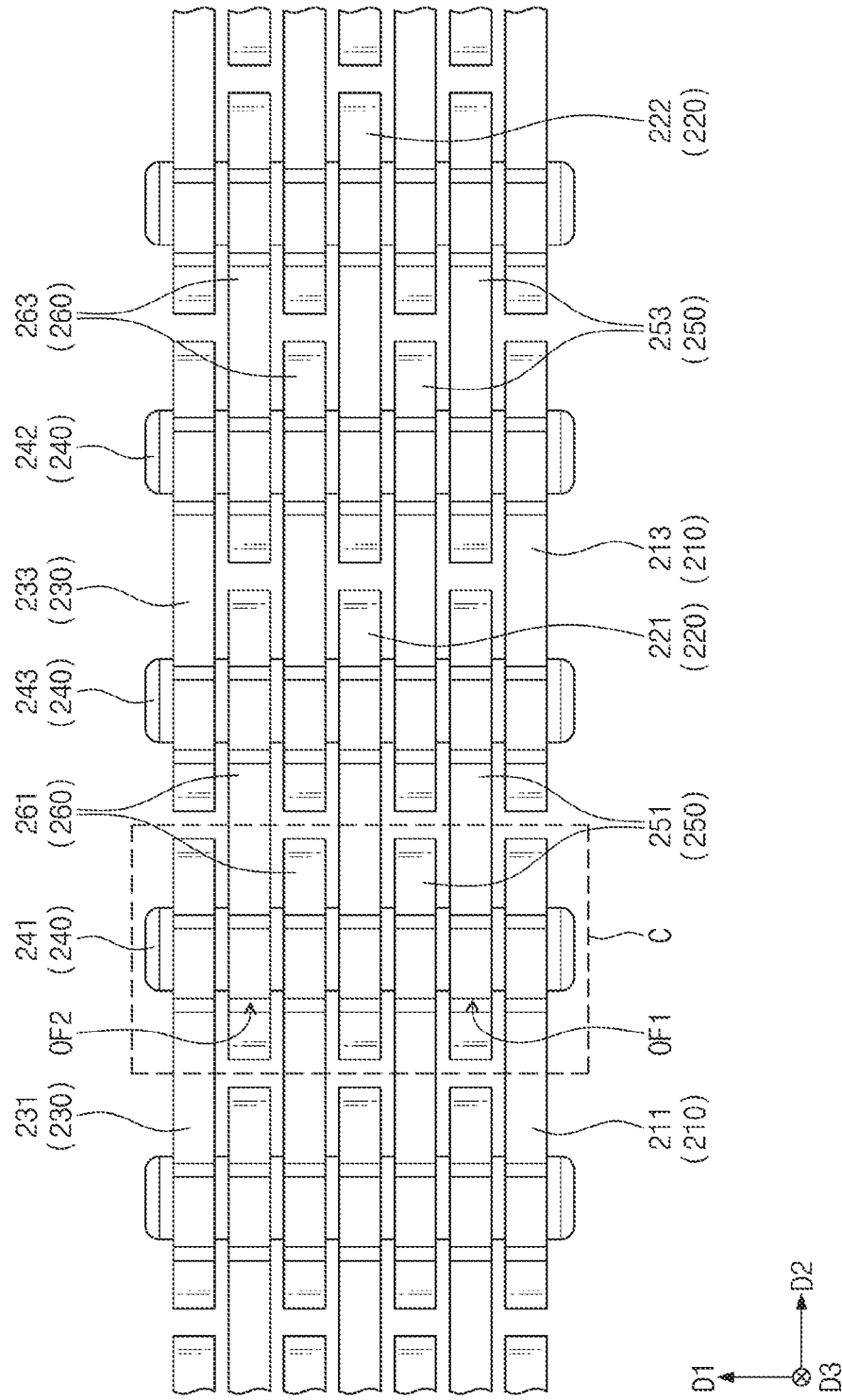
FIG. 9 is a plan view illustrating a modified example of the silent chain of FIG. 2.
Figure 10:
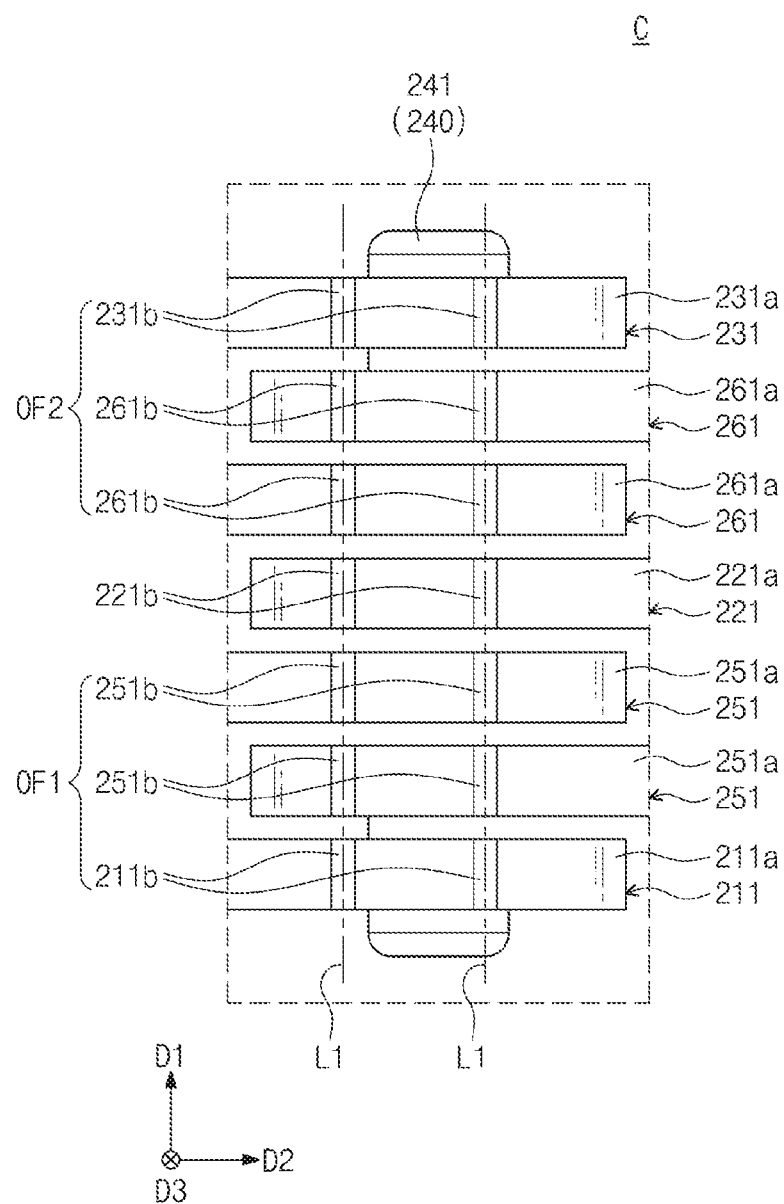
FIG. 10 is an enlarged view of an area C of FIG. 9.

FIG. 9 is a plan view illustrating a modified example of the silent chain of FIG. 2. FIG. 10 is an enlarged view of an area C of FIG. 9. For briefness of description, descriptions with respect to substantially the same component as that described with reference to FIGS. 2 and 3 according to the foregoing embodiment will be omitted, and thus, its difference points will be mainly described.

Referring to FIGS. 9 and 10, each of the first outer grooves 211b, the first inner grooves 251b, the second outer grooves 231b, and the second inner grooves 261b may extend in the first direction D1 or in the width direction of the chain. Each of the first middle grooves 221b may extend in the first direction D1 or in the width direction of the chain.

The first outer grooves 211b and the first inner grooves 251b may define the first oil passage part OF1. The second outer grooves 231b and the second inner grooves 261b may define the second oil passage part OF2. The first outer grooves 211b, the first inner grooves 251b, the second inner grooves 261b, and the second outer grooves 231b may be defined in the first line L1. That is, the first outer grooves 211b, the first inner grooves 251b, the second inner grooves 261b, and the second outer grooves 231b may be defined in the same line. The first middle groove may also be defined in the first line L1. The first line L1 may be parallel to the first direction D1 or the width direction of the chain. Thus, the first and second oil passage parts OF1 and OF2 may be defined in the same line.

Although not shown in FIGS. 9 and 10, the third outer grooves 213b, the third inner grooves 253b, the second middle grooves 222b, the fourth inner grooves 263b, and the fourth outer grooves 233b may be defined in a part of the imaginary third line L3 parallel to the first direction D1.

Figure 11:
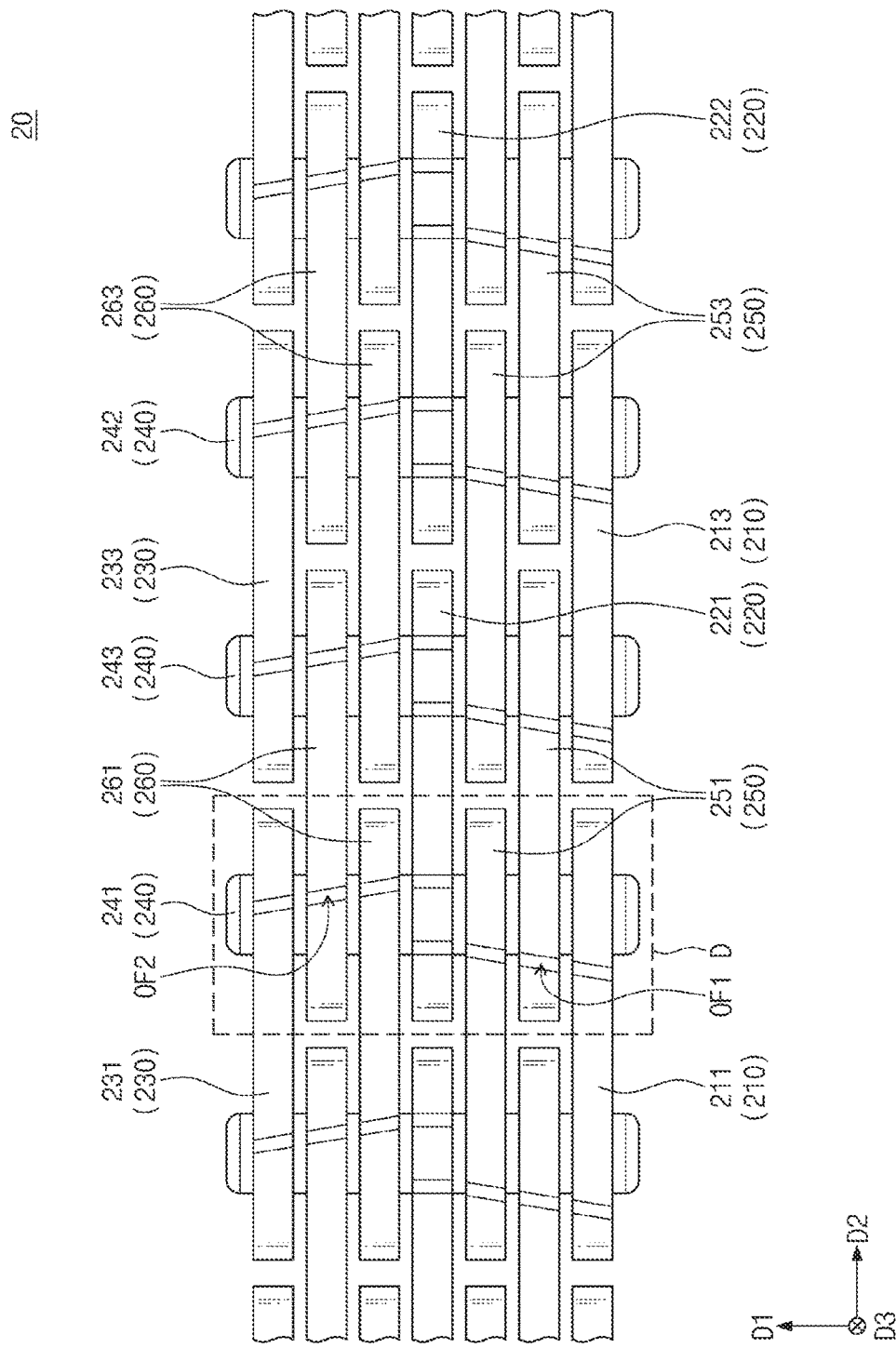
FIG. 11 is a plan view illustrating a modified example of the silent chain of FIG. 2.
Figure 12:
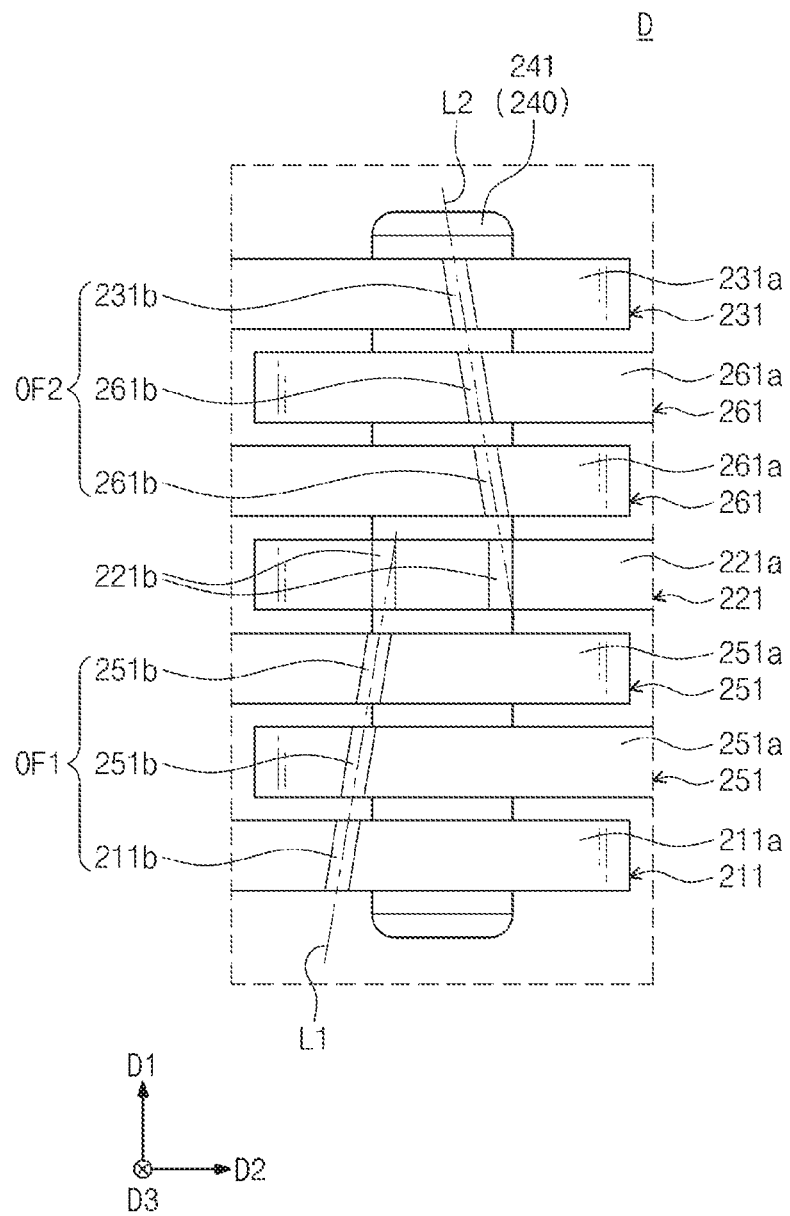
FIG. 12 is an enlarged view of an area D of FIG. 11.

FIG. 11 is a plan view illustrating a modified example of the silent chain of FIG. 2. FIG. 12 is an enlarged view of an area D of FIG. 10. For briefness of description, descriptions with respect to substantially the same component as that described with reference to FIGS. 2 and 3 according to the foregoing embodiment will be omitted, and thus, its difference points will be mainly described.

Referring to FIGS. 11 and 2, the first oil passage part OF1 and the second oil passage part OF2 may be symmetrical to each other with respect to the middle plate part 220. In view of the plane, the first and second oil passage parts OF1 and OF2 may be arranged in a zigzag shape.

Figure 13:
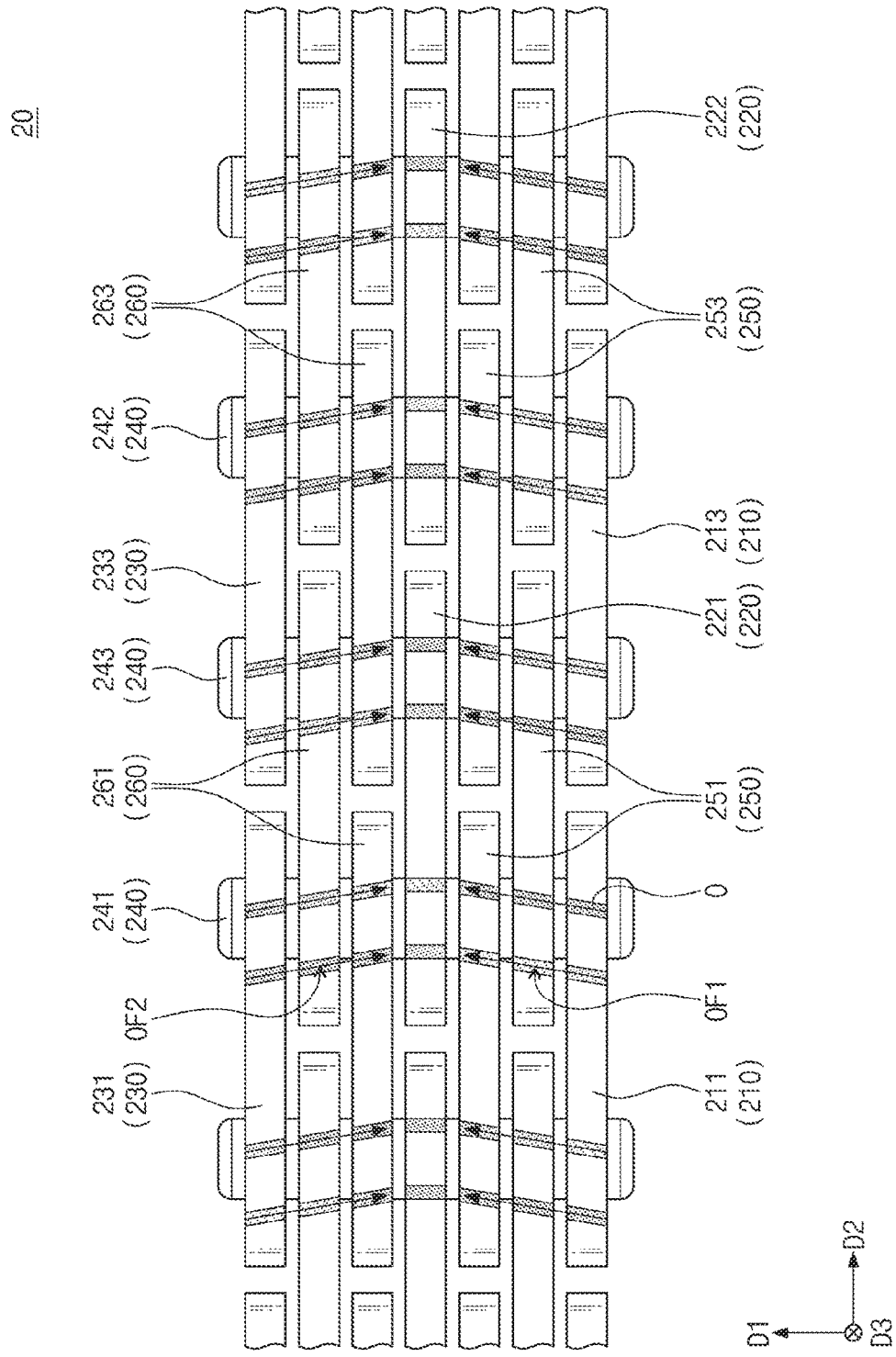
FIG. 13 is a plan view illustrating a flow of oil supplied to the silent chain of FIG. 2.

FIG. 13 is a plan view illustrating a flow of oil supplied to the silent chain of FIG. 2. Arrows of FIG. 13 may represent a flow direction of the oil.

Referring to FIG. 13, oil O existing outside the first guide plate part 210 may successively flow to the first guide plate part 210, the first inner plate part 250, and the middle plate part 220 through the first oil passage part OF1. Also, the oil O existing outside the second guide plate part 230 may successively flow to the second guide plate part 230, the second inner plate part 260, and the middle plate part 220 through the second oil passage part OF2. Thus, the oil O may easily flow to the middle plate part 220 through the first and second oil passage parts OF1 and OF2. That is, the oil O may be smoothly supplied to the middle region. Therefore, the frictional force between the chain and the chain guides may be reduced.

Figure 14:
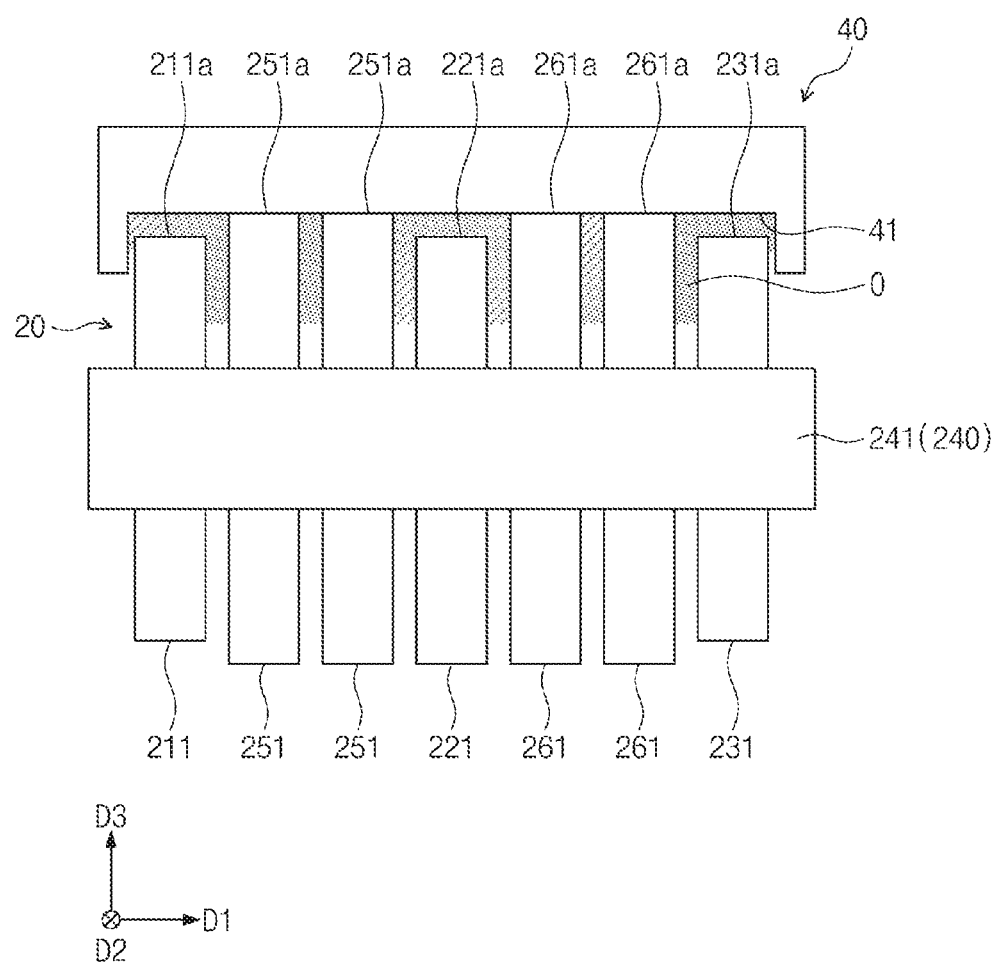
FIGS. 14 and 15 are cross-sectional view illustrating a contact state between the silent chain and the chain guide of FIG. 2.
Figure 15:
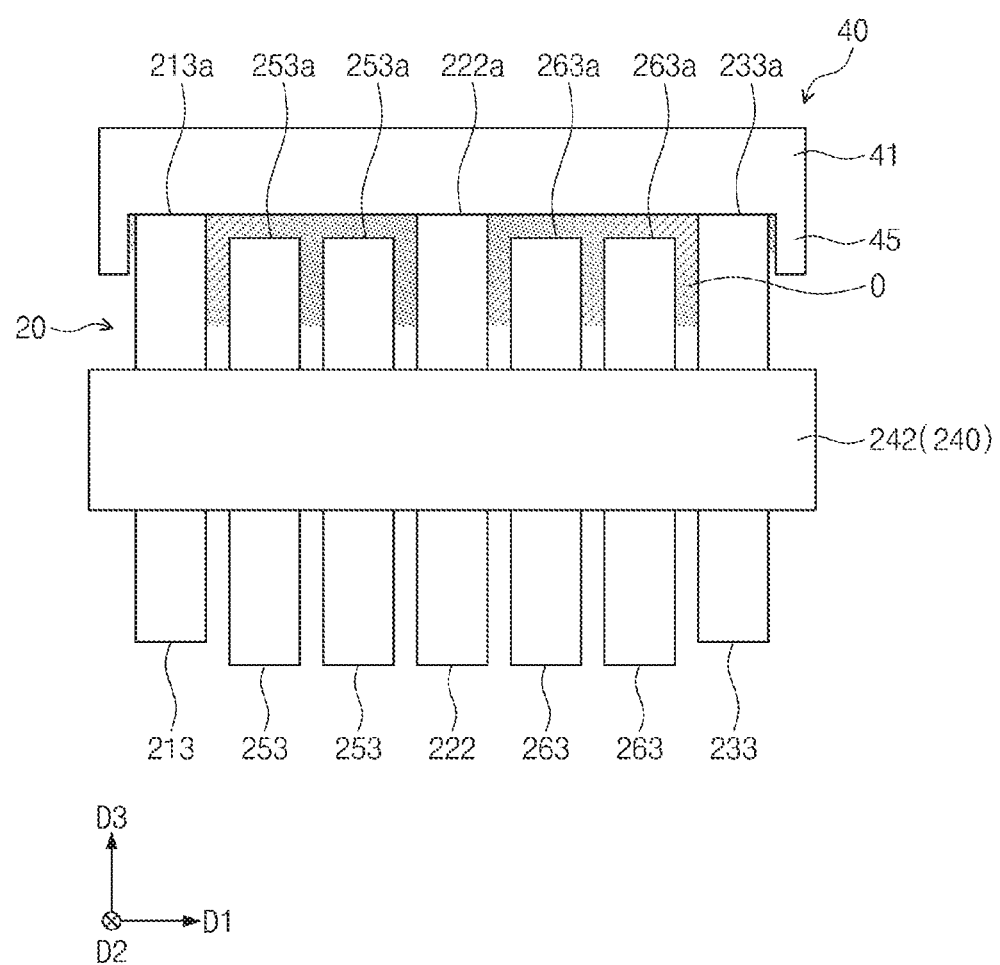

FIGS. 14 and 15 are cross-sectional view illustrating a contact state between the silent chain and the chain guide of FIG. 2. FIG. 14 illustrates a state in which the silent chain 20 comes into contact with the chain guides with reference to FIG. 3. FIG. 14 illustrates a state in which the silent chain 20 comes into contact with the chain guides with reference to FIG. 4.

Referring to FIGS. 3 and 14, the chain guide member 40 may include the sliding surface 41 facing the silent chain 20. The sliding surface 41 may come into slide-contact with the chain 20.

As described above, each of the second and third spaced distances D2 and D3 may be greater than each of the first, fourth, and fifth spaced distances D1, D4, and D5. Thus, only the rear surface 251a of the first inner plate 251 and the rear surface 261a of the second inner plate 261 may come into contact with the sliding surface 41. That is, a contact area between the chain 20 and the chain guide member 40 may be reduced. Thus, the frictional force between the chain 20 and the chain guide member 40 may be reduced.

A space may be defined between the first middle plate 221, the first inner plate 251, the second inner plate 261, and the sliding surface 41. The oil O may be introduced into the space through the first and second inner grooves 251b and 261b. That is, the oil O may be smoothly supplied between the middle plate part 220 and the sliding surface 41. Thus, the frictional force between the middle plate part 220 and the sliding surface 41 may be reduced.

Referring to FIGS. 4 and 14, the sliding surface 41 may come into slide-contact with the chain 20. As described above, each of the sixth, seventh, and tenth spaced distances D6, D7, and D10 may be greater than each of the eighth and ninth spaced distances D8 and D9. Thus, only the rear surface 222a of the second middle plate 222, the rear surface 213a of the third guide plate 213, and the rear surface 233a of the fourth guide plate 233 may come into slide-contact with each other. That is, the contact area between the chain 20 and the chain guide member 40 may be reduced. Thus, the frictional force between the silent chain 20 and the chain guide member 40 may be reduced.

A space may be defined between the second middle plate 222, the third inner plate 253, the third guide plate 213, and the sliding surface 41. The oil O may be introduced and accommodated into the space through the third outer grooves 213b. That is, the oil O may be smoothly supplied between the first inner plate part 250 and the sliding surface 41. Thus, the frictional force between the first inner plate part 250 and the sliding surface 41 may be reduced.

A space may be defined between the second middle plate 222, the fourth inner plate 263, the fourth guide plate 233, and the sliding surface 41. The oil O may be introduced and accommodated into the space through the fourth outer grooves 233b. That is, the oil O may be smoothly supplied between the second inner plate part 260 and the sliding surface 41. Therefore, the frictional force between the second inner plate part 260 and the sliding surface 41 may be reduced.

According to the embodiments of the inventive concept, the lubricant oil may easily flow from the outside to the inside of the silent chain through the grooves defined in the plurality of plates. Thus, the frictional force between the chain guides and the silent chain may be reduced. Since the frictional force between the chain guides and the silent chain is reduced, the silent chain may smoothly travel.

The effects of the present invention are not limited to the aforementioned effects, but other objects not described herein will be clearly understood by those skilled in the art from descriptions below.

While the invention has been described in terms of exemplary embodiments, it is to be understood that the present invention is not limited to the foregoing specific embodiment. As is understood by persons of ordinary skill in the art, a variety of modifications can be made without departing from the scope of the invention defined by the following claims, which should be given their fullest, fair scope.

What is claimed is:

1. A silent chain comprising:
   a first guide plate having a first outer groove in a rear surface thereof;
   a second guide plate spaced apart from the first guide plate in a first direction;
   a first middle plate disposed between the first and second guide plates;
   at least one first inner plate disposed between the first middle plate and the first guide plate and having first inner grooves in a rear surface thereof;
   at least one second inner plate disposed between the first middle plate and the second guide plate; and
   a first connection pin configured to connect the first and second guide plates, the first and second inner plates, and the first middle plate to each other,
   wherein the first inner groove and the first outer groove are located on an imaginary first line,
   wherein a first space distance between the first connection pin and a rear surface of the first middle plate is less than each of a second spaced distance between the first connection pin and the rear surface of the first inner plate and a third spaced distance between the first connection pin and a rear surface of the second inner plate.

2. The silent chain of claim 1, wherein the second guide plate has a second outer groove in a rear surface thereof, and the second inner plate has a second inner groove in a rear surface thereof.

3. The silent chain of claim 2, wherein second inner groove and the second outer groove are located on an imaginary second line different from the first line.

4. The silent chain of claim 2, wherein each of the first outer groove and the first inner groove has an acute angle with respect to a second direction perpendicular to the first direction and extending to the second outer plate, and
   each of the second outer groove and the second inner groove has an acute angle with respect to the second direction and extending to the first outer plate.

5. The silent chain of claim 2, wherein the first outer groove, the first inner groove, the second outer groove, and the second inner groove are located in parallel to the first direction, and
   the second outer groove and the second inner groove are located on the first line.

6. The silent chain of claim 2, wherein each of the second outer groove and the second inner groove is provided in plurality, and
   the plurality of second outer grooves and the plurality of second inner grooves are arranged in a second direction perpendicular to the first direction.

7. The silent chain of claim 1, wherein each of the first outer groove and the first inner groove is provided in plurality, and
   the plurality of first outer grooves and the plurality of first inner grooves are arranged in a second direction perpendicular to the first direction.

8. The silent chain of claim 1, wherein a fourth spaced distance between the first connection pin and the rear surface of the first guide plate is less than the second spaced distance, and a fifth spaced distance between the first connection pin and a rear surface of the second guide plate is less than the third spaced distance.

9. The silent chain of claim 8, further comprising:
a third guide plate spaced apart from the first guide plate in a second direction perpendicular to the first direction;
a fourth guide plate spaced apart from the third guide plate in the first direction and spaced apart from the second guide plate in the second direction;
a second middle plate disposed between the third and fourth guide plates;
at least one third inner plate disposed between the second middle plate and the third guide plate;
at least one fourth inner plate disposed between the second middle plate and the fourth guide plate; and
a second connection pin configured to the third and fourth guide plates, the third and fourth inner plates, and the second middle plate to each other.

10. The silent chain of claim 9, wherein a sixth spaced distance between the second connection pin and a rear surface of the third guide plate is greater than the fourth spaced distance,
a seventh spaced distance between the second connection pin and a rear surface of the fourth guide plate is greater than the fifth spaced distance,
an eighth spaced distance between the second connection pin and a rear surface of the third inner plate is less than the second spaced distance,
a ninth spaced distance between the second connection pin and a rear surface of the fourth inner plate is less than the third spaced distance, and
a tenth spaced distance between the second connection pin and a rear surface of the second middle plate is greater than that of the first spaced distance.

11. The silent chain of claim 10, wherein the second, third, sixth, seventh, and tenth spaced distances are the same.

12. A silent chain comprising:
a first guide plate part;
a second guide plate part spaced apart from the first guide plate part in the first direction;
a middle plate part disposed between the first and second guide plate parts;
a first inner plate part disposed between the first guide plate part and the middle plate part;
a second inner plate part disposed between the second guide plate part and the middle plate part;
a first oil passage part configured to cross a rear area of the first guide plate part and a rear area of the first inner plate part;
a second oil passage part configured to cross a rear area of the second guide plate and a rear area of the second inner plate part; and
a connection pin part configured to connect the first and second guide plate parts, the first and second inner plate parts, and the middle plate part to each other,
wherein the first guide plate part comprises a plurality of first guide plates arranged at a predetermined distance in a second direction perpendicular to the first direction and a plurality of third guide plates disposed between the first guide plates adjacent to each other,
wherein the second guide plate part comprises a plurality of second guide plates arranged at a predetermined distance in the second direction and a plurality of fourth guide plates disposed between the second guide plates adjacent to each other,
rear surfaces of the third guide plates are spaced apart from rear surfaces of the first guide plates in a third direction perpendicular to the first and second directions, and
rear surfaces of the fourth guide plates are spaced apart from rear surfaces of the second guide plates in the third direction.

13. The silent chain of claim 12, wherein the first and second oil passage parts are disposed to face each other.

14. The silent chain of claim 13, wherein each of the first and second oil passage parts is inclined in a second direction perpendicular to the first direction.

15. The silent chain of claim 14, wherein a spaced distance between the first and second oil passage parts gradually increases in a direction that is away from the middle plate part.

16. The silent chain of claim 12, wherein the first oil passage part comprises grooves formed in the rear area of the first guide plate and grooves formed in the rear area of the first inner plate part.

17. The silent chain of claim 12, wherein the second oil passage part comprises grooves formed in the rear area of the second guide plate and grooves formed in the rear area of the second inner plate part.

18. The silent chain of claim 12, wherein the first inner plate part comprises a plurality of inner plates arranged at a predetermined distance in a second direction perpendicular to the first direction and a plurality of third inner plates disposed between the first inner plates adjacent to each other,
the second inner plates part comprises a plurality of second inner plates arranged at a predetermined distance in the second direction and a plurality of fourth plates disposed between the second inner plates adjacent to each other,
rear surfaces of the first inner plates are spaced apart from rear surfaces of the third inner plates in a third direction perpendicular to the first and second directions, and
rear surfaces of the second inner plates are spaced apart from rear surfaces of the fourth inner plate in the third direction.

* * * * *